(12) United States Patent
Malmstrom

(10) Patent No.: US 6,643,455 B1
(45) Date of Patent: Nov. 4, 2003

(54) OBJECT IMAGING SYSTEM

(75) Inventor: Kurt David Malmstrom, Beenleigh (AU)

(73) Assignee: RMS Research Management Systems, Inc., Alberta (CA)

( * ) Notice: Subject to any disclaimer, the term of this patent is extended or adjusted under 35 U.S.C. 154(b) by 0 days.

(21) Appl. No.: 10/030,953
(22) PCT Filed: Jul. 10, 2000
(86) PCT No.: PCT/AU00/00829
§ 371 (c)(1), (2), (4) Date: Jan. 8, 2002
(87) PCT Pub. No.: WO01/04606
PCT Pub. Date: Jan. 18, 2001

(30) Foreign Application Priority Data

Jul. 9, 1999 (AU) .............................. PQ 1543

(51) Int. Cl.[7] .......................... A22C 18/00; G03B 15/00
(52) U.S. Cl. ........................ 396/4; 396/1; 396/2; 396/3; 396/5; 362/11; 452/158
(58) Field of Search ................................ 396/1, 2, 3, 4, 396/5; 452/158, 198; 362/11

(56) References Cited

U.S. PATENT DOCUMENTS

| | | | |
|---|---|---|---|
| 4,414,576 A | 11/1983 | Randmae | |
| 4,939,574 A | 7/1990 | Petersen et al. | |
| 5,155,358 A | 10/1992 | Larson | |
| 5,194,036 A | * 3/1993 | Chevalier et al. | ............ 452/594 |
| 5,944,598 A | * 8/1999 | Tong et al. | ................. 452/158 |

FOREIGN PATENT DOCUMENTS

| | | | |
|---|---|---|---|
| EP | 730146 A | 9/1996 | .......... G01N/21/84 |
| GB | 2255837 A | 11/1992 | .......... G05B/13/02 |
| JP | 7107349 A | 4/1995 | |
| JP | 8220252 A | 8/1996 | |

* cited by examiner

Primary Examiner—Russell Adams
Assistant Examiner—Michael Dalakis
(74) Attorney, Agent, or Firm—Drummond & Duckworth

(57) ABSTRACT

An object imaging system, particularly for slaughtered animal carcases or meat pieces, includes an imaging station to which the object (10) is introduced, a camera (20) at the imaging station, and lighting means (30). The imaging station includes a backing member (15) for providing a background for the object (10), and an image capture enclosure (21) which has an open side (22) facing towards the backing member (15), the inside surfaces of the enclosure (21) being non-reflective. The camera (20) is mounted in the enclosure (21) and faces towards the open side (22) and towards the backing member (15). The lighting means (30) includes multiple light sources (31), some of the light sources (35, 36, 37) being provided inside the image capture enclosure (21) and located so as to face towards the open side (22) thereof and some of the light sources (32, 33, 34) being provided outside the enclosure to face towards the backing member (15), the light sources (31) being located at points which define an imaginary concave surface (38) with the concavity facing towards and being generally focussed on a region where the object (10) is introduced for imaging. The camera (20) has an associated camera housing (40) completely enclosing the camera in a sealed environment, the housing (40) having an associated temperature control means (45) operative to maintain a predetermined temperature or temperature range for the camera (20).

8 Claims, 3 Drawing Sheets

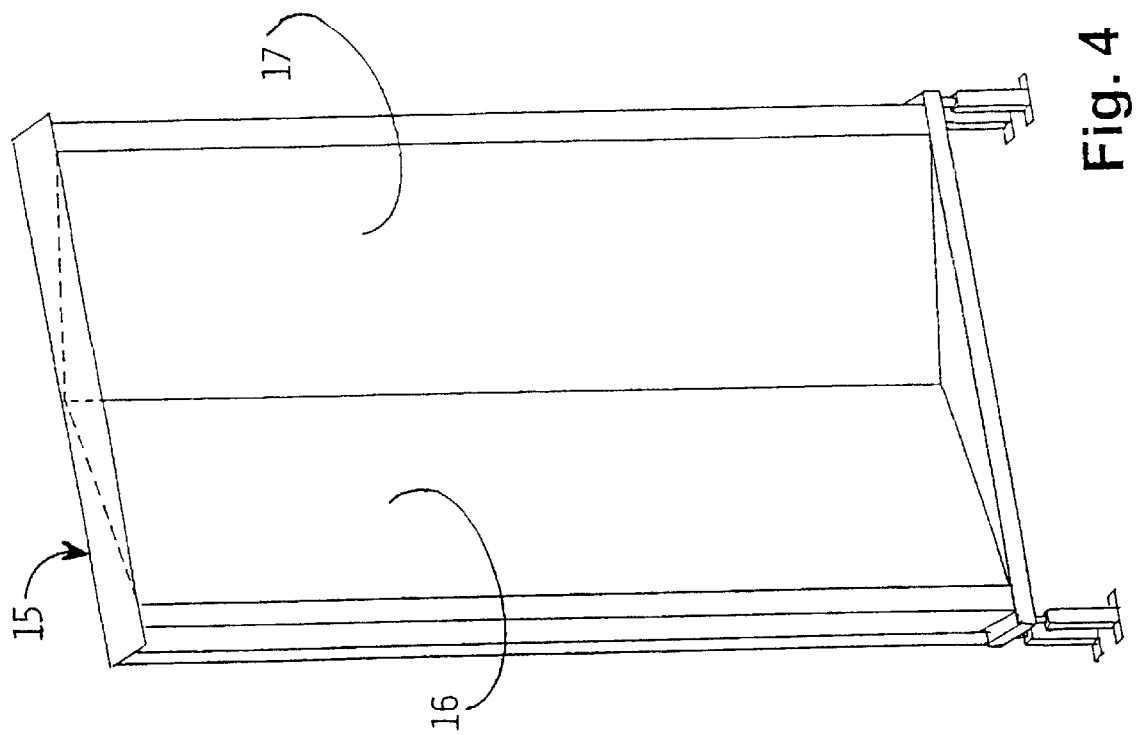
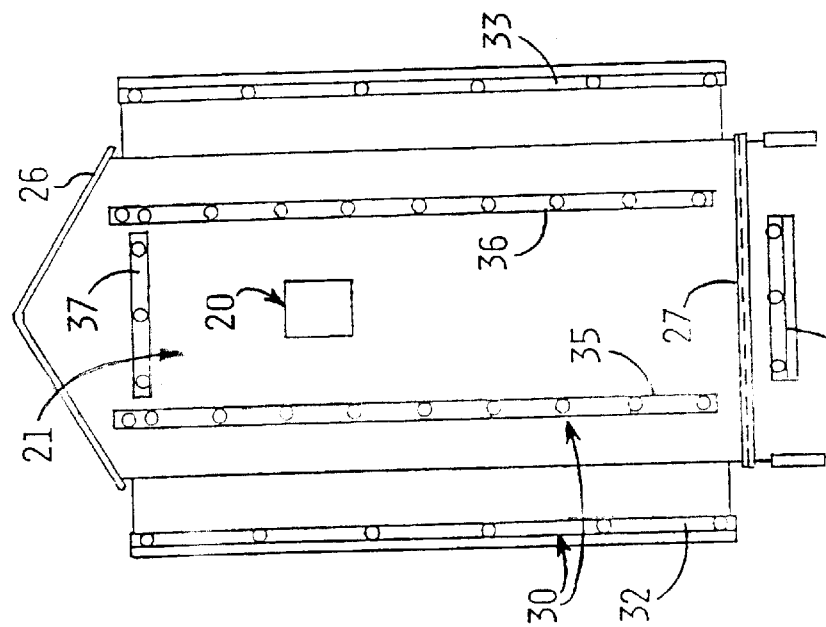

OBJECT IMAGING SYSTEM

FIELD OF THE INVENTION

This invention relates to object imaging systems, particularly systems for imaging a target object such as a meat carcase or other meat cut or meat portion for enabling data capture and analysis.

BACKGROUND OF THE INVENTION

There have been a number of systems proposed or developed for imaging of carcases or meat cuts or meat portions so that the image can be analysed for identifying parameters such as size and shape, colour and hence proportion of meat and/or fat. The analysis can be used for automated processing or grading of the carcase or meat.

It is known or proposed in these systems to provide some degree of control of the lighting of the target object during the image capture so that consistency and reliability of measurements and analyses can be improved. For example, in patent specification WO-95/21375, meat pieces on a conveyor move past an imaging station where images are captured as the pieces pass beneath a hood in which illuminating lamps are provided to illuminate the meat pieces on the conveyor. A camera at the top of the hood faces downwardly to capture the images of the meat pieces. However, with this arrangement, there can be many secondary reflections within the hood which may lead to inconsistency between measurement or analysis of similar meat pieces. Also, the camera is arranged so that there may be considerable variability in consistency of its performance. The lighting type and arrangement may not be optimal.

OBJECT OF THE INVENTION

It is an object of the present invention to provide an object imaging system which can enable reliable repeated imaging of objects such as meat carcases so that measurements and analyses of the measurements can be consistent when used in different environments or locations and consistent throughout periods of continual use.

SUMMARY OF THE INVENTION

The object imaging system according to the present invention includes an imaging station to which a target object is introduced, a camera provided at the imaging station for capturing an image of the target object, and lighting means for illuminating the target object during the capture of the image, wherein: the imaging station includes a backing member for providing a background for the target object when it is being imaged for the camera, and an image capture enclosure which has an open side facing towards the backing member and spaced from the backing member so that the target object can be introduced into the space between the backing member and the open side of the image capture enclosure, the inside surfaces of the image capture enclosure being non-reflective, the camera being mounted in the image capture enclosure and facing towards the open side thereof and towards the backing member, and the lighting means being at least partially provided inside the image capture enclosure and facing the open side thereof and towards the backing member so as to illuminate the target object when it is introduced.

According to a first aspect of the invention the lighting means includes multiple light sources, some of the light sources being provided inside the image capture enclosure and located so as to face towards the open side thereof and some of the light sources being provided outside the image capture enclosure but also being located so as to face towards the backing member so as to illuminate target objects introduced into the space between the backing member and the open side of the image capture enclosure, the light sources being located at points which define an imaginary concave surface with the concavity facing towards and being generally focussed on a region where the target object is introduced for imaging.

The backing member may be in the form of a screen having angled panels arranged so that specular reflections from the light sources towards the camera are minimised. The panels are preferably non-reflective. Also preferably the inside surfaces of the enclosure are non-reflective.

The preferred construction of the enclosure includes the side walls, a back wall opposite the open side, a canopy which partially extends beyond the open side to partially cover the space between the open side and the backing member, and a floor, all of these components being internally non-reflective and being of a dark colour, whereby unwanted secondary reflections within the image capture enclosure can be minimised.

The light sources which are external to the enclosure preferably include a bottom array of light sources to direct light generally upwardly onto the object, and the light sources which are located internally of the enclosure preferably include a top array of light sources directing light generally downwardly onto the object. All of the internal light sources preferably project light out through the open side from positions in front of the camera which is located towards the back of the enclosure.

The shape of the concavity in plan view may be generally parabolic or semi-circular. In the embodiment with light sources directing light upwardly and downwardly onto the object, the shape of the concavity, with the bottom and top arrays of light sources included, may be of a generally hemispherical configuration.

According to a second aspect of the invention, the object imaging system is characterised in that the camera has an associated camera housing completely enclosing the camera in a sealed environment inside the housing, the housing providing a viewing window through which the camera is directed towards the open side of the image capture enclosure, the camera housing having an associated temperature control means operative to maintain a predetermined temperature or temperature range for the camera within the housing and thereby help enable consistent repeatable performance of the camera throughout a period of continual use of the camera in capturing successive images of target objects.

In the second aspect, the camera housing preferably completely encloses the camera in a sealed environment within the housing and means are provided associated with the housing to maintain a low humidity environment for the camera in spite of variable or high humidity in the ambient surroundings.

The temperature control means may include a heat sink thermally coupled to the camera for buffering and enabling temperature control at the camera. For example, there may be provided an active temperature adjuster which has an associated temperature sensing means, the temperature adjuster bring responsive to a sensed fall in temperature to provide heating and, conversely, being operative in response to sensing of rising temperature at the camera to provide cooling. The active temperature adjuster may comprise a thermoelectric apparatus and associated current control circuitry.

The present invention has been particularly developed as an object imaging system for use in abattiors and the like, wherein the object is a carcase of a slaughtered animal, the carcase being suspended from an overhead conveyor and conveyed thereon into and out of the imaging station between the backing member and the open side of the image capture enclosure.

BRIEF DESCRIPTION OF THE DRAWINGS

Possible and preferred features of the present invention will now be described with particular reference to the accompanying drawings. However it is to be understood that the features illustrated in and described with reference to the drawings are not to be construed as limiting on the scope of the invention. In the drawings:

FIG. 3 is an elevational view facing into the image capture enclosure of the system shown in FIG. 1, FIG. 4 is a rear perspective view of the backing member of the system illustrated in FIG. 1.

DETAILED DESCRIPTION OF THE PREFERRED EMBODIMENTS

Figure 1:
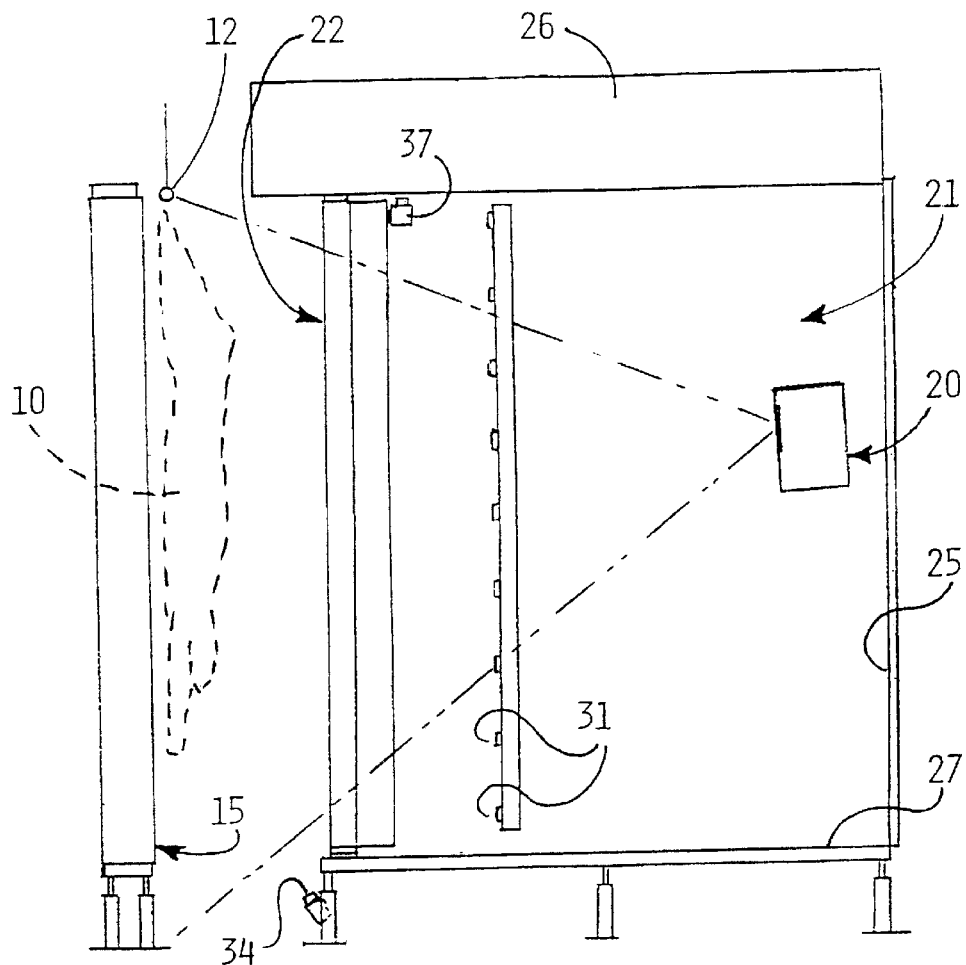
FIG. 1 is a schematic side sectional view of an object imaging system according to the present invention and designed for imaging meat carcases.

It will be convenient to describe the invention further with reference to the embodiment in the drawings in which the target object to be imaged is a meat carcase. However, it is to be understood that other meat cuts or portions or other target objects can be imaged according to the invention.

Figure 2:
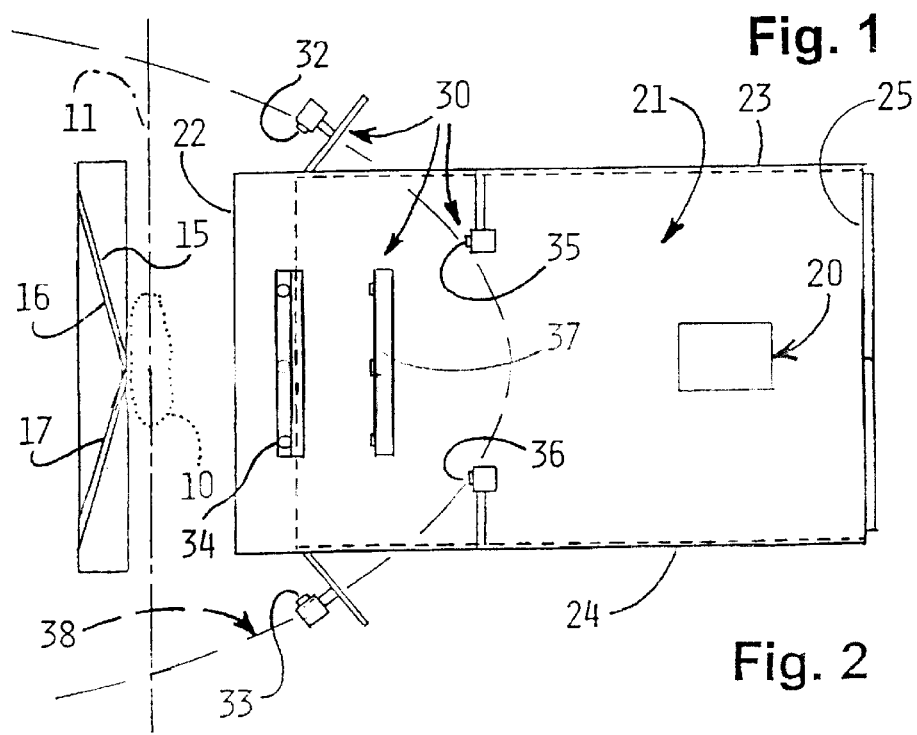
FIG. 2 is a top plan view of the system of FIG. 1.

The imaging system in the drawings is for imaging a carcase 10 which may be suspended by a hook 12 from an overhead conveyor of a conventional kind used in abattoirs or meat processing plants. As shown in FIG. 2, the carcase 10 can be moved to the imaging station along the path 11. Each successively presented carcase is in practice preferably introduced in the same rotational orientation so as to present the same side of the carcase for each imaging operation.

The carcase 10 is introduced to the imaging station which comprises a backing member 15 for providing a background. The backing member 15 is in the form of a screen having angled panels 16, 17 arranged so that specular reflections from the light sources towards the camera 20 are minimised. The panels 16, 17 are preferably non-reflective and may be black powder coated metal panels.

The imaging station also includes an image capture enclosure 21 having an open side 22 opening towards the backing member 15 so that the carcase 10 is located for the imaging operation between the backing member 15 and the open side 22 of the enclosure 21. The inside surfaces of the enclosure 21 are also non-reflective, such as matt black powder coated stainless steel sheet. The enclosure 21 includes side walls 23, 24, a back wall 25 opposite the open side 22, a canopy 26 which partially extends beyond the open side 22 to partially cover the space between the open side 22 and the backing member 15, and a floor 27—all of these components being internally non-reflective and preferably being black or at least very dark. With this arrangement, the unwanted secondary reflections within the image capture enclosure 21 can be minimised.

The camera 20 is located within the image capture enclosure 21 and faces the open side 22, i.e. towards the backing member 15. The imaging station also includes lighting means 30 which is at least partially provided inside the enclosure 21 but facing towards the open side 22 so as to illuminate the carcase 10. The lighting means 30 in the illustrated embodiment comprises multiple light sources 31 such as quartz halogen lamps arranged to direct light from multiple directions onto the carcase 10. Some of the light sources are external to the enclosure 21 as shown at 32, 33, 34, the last of these being a bottom array of light sources to direct light generally upwardly onto the carcase 10. Other ones of the light sources are located internally of the enclosure 21 as shown at 35, 36, 37, the last of these comprising a top array of light sources directing light generally downwardly onto the carcase. The light sources 32, 33, 35, 36 are vertical arrays of lamps 31 mounted on suitable supports. All of the internal light sources project light out through the open side 22 from positions in front of the camera 20 which is located towards the back 25 of the enclosure 21.

As best seen in FIG. 2, the light sources are arranged in a concave surface configuration 38 with the concavity facing generally towards the carcase 10 and preferably with the carcase 10 being located generally at the center or focus of the concavity. The shape of the concavity 38 in the plan view may be generally parabolic, semi-circular or, with the bottom and top arrays 34, 37 included, may be in a generally hemispherical configuration. With this arrangement of light sources, there can be provided a high ratio of controlled light to ambient light to thereby provide controlled colour temperature and intensity of light over the field of view of the camera and to provide optimal edge contrast for imaged carcases. If desired, cooling means may be provided for the light sources 31 such as by providing air conveying hoses or the like extending around past the individual lamps, the cooling system including a fan or blower to circulate cooling air over the light sources.

Figure 5:
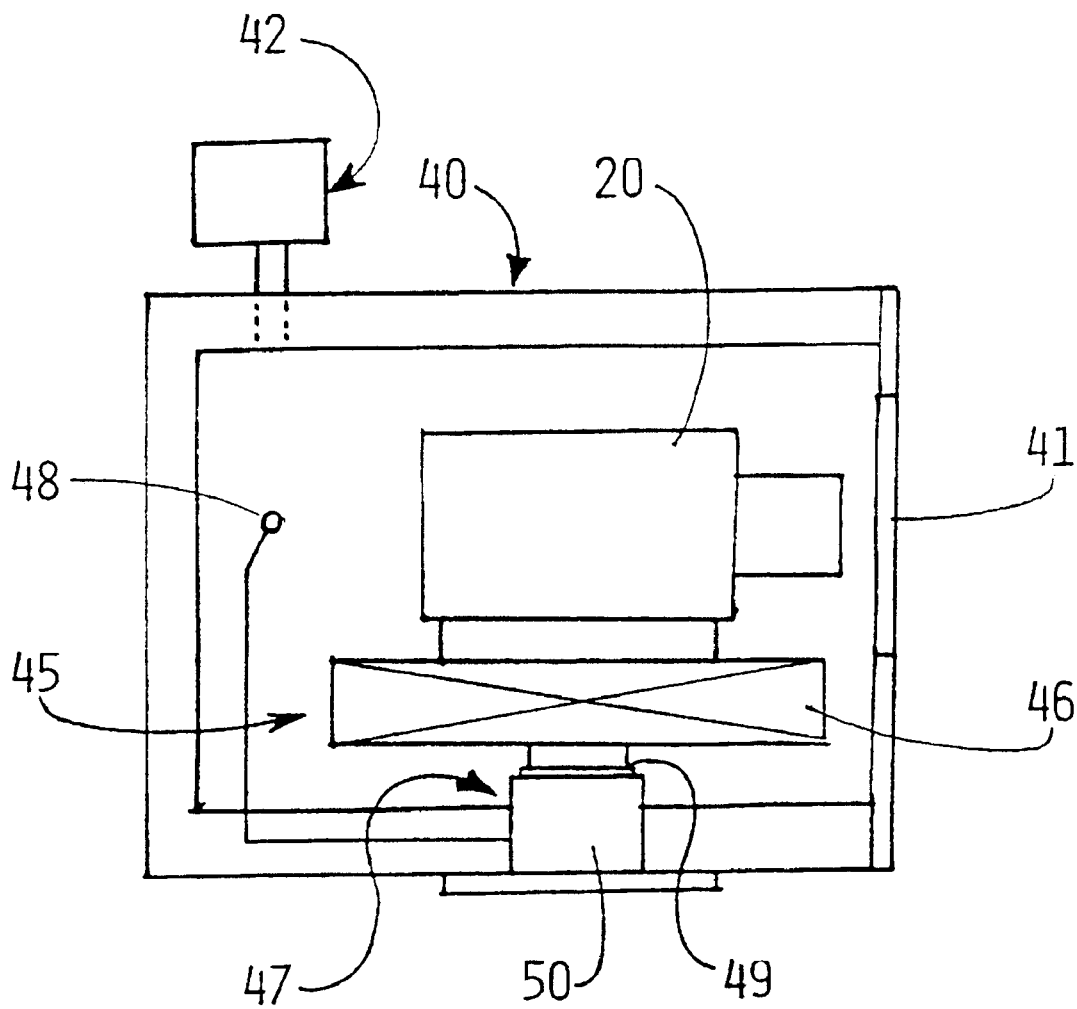
FIG. 5 is a plan view of a camera housing useable in the present invention.

The camera 20 as shown in FIG. 5 is mounted within a camera housing 40 which completely encloses the camera in a sealed environment within the housing, and means 42, such as air conditioner means, are provided to enable maintenance of a low humidity environment for the camera in spite of variable and possibly very high humidity in the ambient surroundings such as in an abattoir. The housing 40 provides a viewing window 41 through which the camera faces towards the open side 22 of the enclosure 21. Temperature control means 45 is associated with the camera 20 and/or with the housing 40 and is operative to maintain a predetermined temperature or temperature range for the camera within the housing. In the illustrated embodiment, the temperature control means 45 can comprise a heat sink 46 thermally coupled to the camera 20 for buffering and enabling temperature control. For actively controlling the temperature of the camera through the heat sink 46, there is provided an active temperature adjuster 47 which can have associated temperature sensing means 48. The temperature adjuster 47 is responsive to a sensed fall in temperature to provide heating and, conversely, is operative in response to sensing of rising temperature at the camera to provide cooling. The active temperature adjuster 47 may comprise, for example, a thermoelectric apparatus such as a Peltier device 49 and associated current control circuitry 50. Alternatively, or in addition, there may be provided fluid conduits through the camera housing 40, such as cooling or heating water conduits through which heated or cooled water can be circulated to maintain the predetermined temperature or temperature range of the camera. The performance of a colour camera such as a CCD colour video camera can be sensitive to changes in the temperature at which it is operating and therefore for consistent and repeatable image capture operations between different sites and over periods of continual use, the temperature control provided for the camera in the preferred embodiment of the invention significantly improves the performance of the system.

It will be seen that the object imaging system of the present invention as herein described and illustrated can enhance system accuracy and site to site consistency and reliability. The imaging station construction and configuration provides an environment to enable accurate repeatable positioning and illumination of target objects and image capture. The influence of extraneous light sources such as light sources within an abattoir or external sun light can be minimal. The imaging station components are robust and can be easily cleaned using conventional abattoir cleaning equipment.

What is claimed is:

1. An object imaging system including an imaging station to which a target object (10) is introduced, a camera (20) provided at the imaging station for capturing an image of the target object, and lighting means (30) for illuminating the target object (10) during the capture of the image, wherein:

the imaging station includes a backing member (15) for providing a background for the target object (10) when it is being imaged by the camera (20) and an image capture enclosure (21) which has an open side (22) facing towards the backing member (15) and spaced from the backing member so that the target object (10) can be introduced into the space between the backing member and the open side (22) of the image capture enclosure (21), the inside surfaces of the image capture enclosure (21) being non-reflective, the camera (20) being mounted in the image capture enclosure (21) and facing towards the open side (22) thereof and towards the backing member (15), and the lighting means (30) being at least partially provided inside the image capture enclosure (21) and facing the open side (22) thereof and towards the backing member (15) so as to illuminate the target object (10) when it is introduced, the object imaging system being characterised in that:

the lighting means (30) includes multiple light sources (31), some of the light sources (35), (36), (37) being provided inside the image capture enclosure (21) and located so as to face towards the open side (22) thereof and some of the light sources (32), (33), (34) being provided outside the image capture enclosure but also being located so as to face towards the backing member (15) so as to illuminate target objects (10) introduced into the space between the backing member and the open side (22) of the image capture enclosure (21), the light sources (31) being located at points which define an imaginary concave surface (38) with the concavity facing towards and being generally focussed on a region where the target object (10) is introduced for imaging.

2. An object imaging system as claimed in claim 1 wherein the backing member (15) is in the form of a screen having angled panels (16), (17) arranged so that specular reflections from the light sources (31) towards the camera (20) are minimized.

3. An object imaging system as claimed in claim 2 wherein the panels (16), (17) are non-reflective.

4. An object imaging system as claimed in claim 1 wherein the enclosure (21) includes side walls (23), (24) a back wall (25) opposite the open side (22), a canopy (26) which partially extends beyond the open side (22) to partially cover the space between the open side (22) and the backing member (15) and a floor (27), all of these components being internally non-reflective and being of a dark colour, whereby unwanted secondary reflections within the image capture enclosure (21) are minimized.

5. An object imaging system as claimed in claim 1 wherein the light sources (32), (33), (34) which are external to the enclosure (21) include a bottom array of light sources (34) to direct light generally upwardly onto the object (10), and the light sources (35), (36), (37) which are located internally of the enclosure (21) include a top array of light sources (37) directing light generally downwardly onto the object.

6. An object imaging system as claimed in claim 1 wherein all of the internal light sources (35), (36), (37) project light out through the open side (22) from positions in front of the camera (20) which is located towards the back (25) of the enclosure (21).

7. An object imaging system as claimed in claim 1 wherein the shape of the concavity (38) in plan view is generally parabolic or semi-circular.

8. An object imaging system as claimed in claim 5 wherein the shape of the concavity (38), with the bottom and top arrays of light sources (34), (37) included, is of a generally hemispherical configuration.

* * * * *